(No Model.) 2 Sheets—Sheet 1.
C. SINNING.
CLUTCH.
No. 518,865. Patented Apr. 24, 1894.
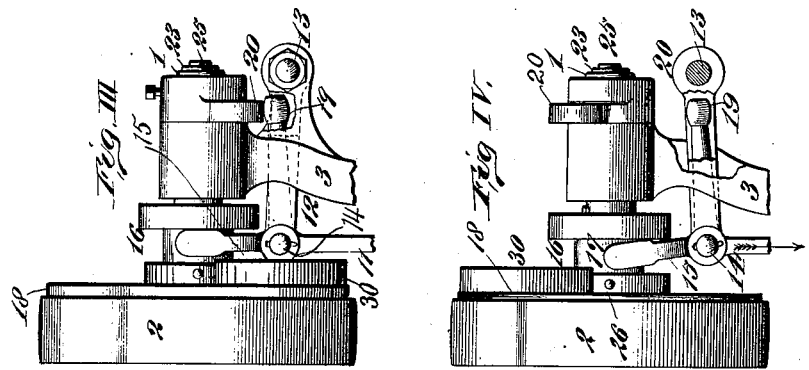
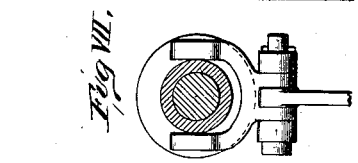
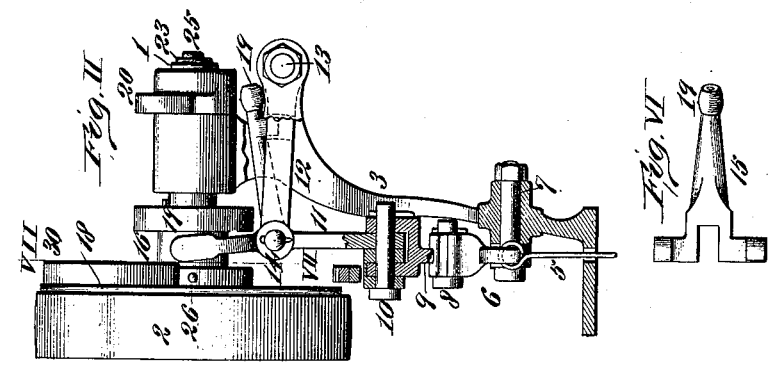
Attest
W. H. Scott
A. W. Ebersole
Inventor:
Charles Sinning
by Knight Bro
Attys (No Model.) 2 Sheets—Sheet 2.
C. SINNING.
CLUTCH.
No. 518,865. Patented Apr. 24, 1894.
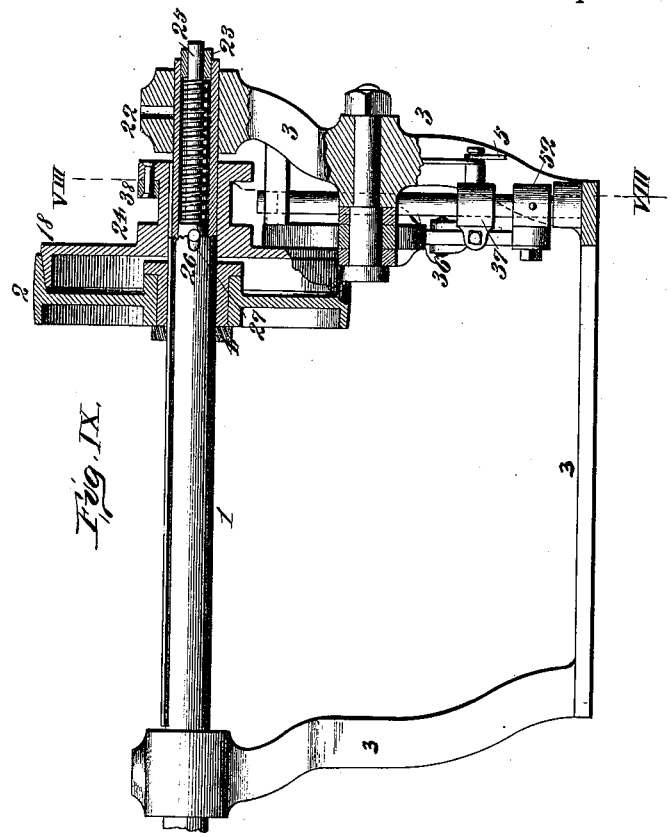
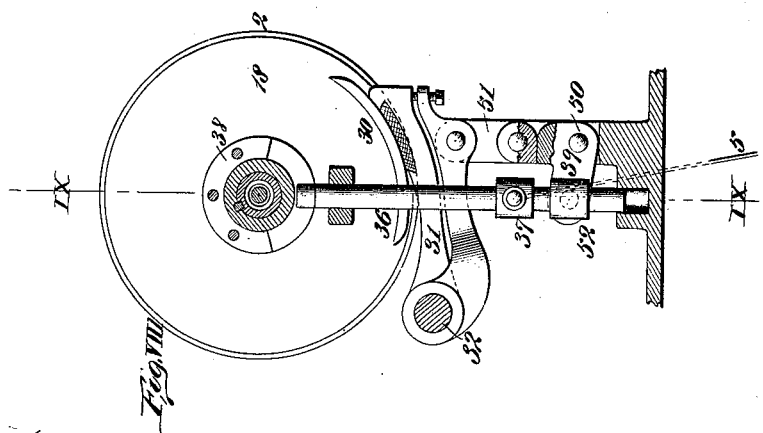
Attest  
Inventor:  
Charles Sinning  
By Wright Bros  
Attys

UNITED STATES PATENT OFFICE.

CHARLES SINNING, OF ST. LOUIS, MISSOURI, ASSIGNOR TO THE SINNING LASTING MACHINE COMPANY, OF SAME PLACE.

CLUTCH.

SPECIFICATION forming part of Letters Patent No. 518,865, dated April 24, 1894.

Application filed November 4, 1893. Serial No. 489,996. (No model.)

*To all whom it may concern:*

Be it known that I, CHARLES SINNING, of the city of St. Louis, in the State of Missouri, have invented a certain new and useful Improvement in Clutches, of which the following is a full, clear, and exact description, reference being had to the accompanying drawings, forming part of this specification.

My invention relates to an improved clutch, which is well adapted for use in a lasting machine, but which may be used in other machinery.

My invention consists in features of novelty hereinafter fully described and pointed out in the claims.

Figure I is a side view of the clutch. Fig. II is part in elevation, and part in section on line II—II, Fig. I, showing the clutch engaged. Fig. III is an elevation showing the clutch disengaged. Fig. IV is a similar view showing the clutch engaged. Fig. V is a top view of the supporting lever for the bell-crank of the clutch. Fig. VI is a top view of the bell-crank lever of the clutch. Fig. VII is a section taken on line VII—VII, Fig. II. Fig. VIII is a section, taken on line VIII—VIII, Fig. IX, and illustrating a modification of the clutch. Fig. IX is a vertical section, taken on line IX—IX, Fig. VIII.

Referring to the drawings, 1 represents the shaft to be driven, and 2 the pulley that drives it. The shaft is journaled in a suitable frame 3. The pulley is mounted loosely on a bushing 4, keyed to the shaft.

5 represents a pull rod. The rod 5 is connected to one end of a bell-crank lever 6, which is pivoted at 7 to the frame of the machine. The end of the lever which does not have connection with the rod 5 is pivoted at 8 to a link 9; this end of the bell-crank lever and the link forming a kind of toggle. The upper end of the link is connected by a bolt 10, and a bar or second link 11, to the inner end of a bar or link 12, the outer end of the bar or link 12 being pivoted at 13, to the frame of the machine. The link 11 is connected to the link 12 by means of a bolt or pin 14.

15 represents a bell-crank lever pivoted to the inner end of the link 12 by means of the pin 14. One end of this bell crank lever is bifurcated, or forked, to fit in the groove 16 of the hub 17, of the clutch 18. The other end of the bell crank lever 15 is provided with a friction roller 19, adapted to be engaged by a cam 20, secured to the shaft 1, upon which is also mounted the recessed pulley 2, with which the clutch engages.

21 represents a spring connecting the joint between the upper end of the bell crank lever 6 and the link 9 to the frame of the machine, as shown in Fig. I. The pulley 2 has a conical or tapering recess to receive the clutch 18, as shown in Fig. IX. The end of the shaft 1 is recessed to receive a spring 22, (see Fig. IX,) which has bearing between a collar 23, tapped into the outer end of the shaft, and a head 24 on the inner end of a rod 25 fitting in the hollow part of the shaft. The head 24 bears against a pin 26, fitting in slots 27 in the shaft, at its hollow part, the outer ends of said pin fitting in perforations in the hub of the clutch 18, one end of the pin being shown in Figs. II, III and IV. When the rod 5 is depressed, (which is the time the machine is working,) the bell-crank lever 15 is pulled down into the position shown in Fig. IV, so that the outer end of the lever cannot be engaged by the cam 20, as the shaft revolves; and at this time the clutch is held into frictional contact with the pulley 2 by means of the spring 22, the operating parts of the machine being now driven through the shaft 1, turned by the pulley 2, and the clutch 18; the clutch having feather and groove connection with the shaft, as shown in Fig. IX, while the pulley is loose on the bushing 4, keyed to the shaft. The shaft 1 is driven by the pulley through the means of the clutch, (when the clutch is in engagement with the pulley) by means of a belt, not shown) passing over the pulley. The tension of the spring 22 is sufficient to hold the clutch against the pulley 2, with sufficient force to insure the turning of the shaft 1, through means of the pulley and clutch. When the rod 5 is released, the spring 21 draws the toggle formed by the upper end of the bell crank lever 6 and link 9 back into a straight line, as shown in Fig. I, and the bell crank lever 15 is raised to its position shown in Fig. II, and as soon as the cam 20 engages the outer end 19 of the lever 15, it will, by depressing this end of the lever, throw the clutch out of engagement with the pulley, the shaft 1 will stop turning, and the machine will be at rest while the pulley 2 continues to revolve. The form of the arm 12, is shown in Fig. V, where it is illustrated as being double. The form of the bell crank lever 15 is shown in Fig. VI. For the purpose of applying a brake, and stopping the rotation of the shaft 1, simultaneously with the throwing out of the clutch, I form a ledge 30 on the clutch 18, and pivot a bar 31 to the frame of the machine at 32, see Fig. I. The free end of this bar has a shoe.

33 represents a lever pivoted at 32, and which is located beneath the bar 31. The inner end of this lever is connected to the upper end of the link 9 by means of the pin 10, see Fig. II. It will thus be seen that when the toggle is straightened, the inner ends of the lever 33 and bar 31 will be raised with the lever 15, and as the cam 20 throws the clutch out of engagement, the ledge 30 on the clutch comes against the shoe on the bar 31, and thus the shaft 1 is brought to a stop or rest.

35 represents a set screw fitted in the end of the lever 33, and against which the inner end of the bar 31 rests. By adjusting this set screw, the wear of the shoe can be compensated for.

In the form of clutch shown in Figs. VII and IX, the clutch itself is the same as in the form just described, but instead of using the mechanism described for moving the clutch out of engagement with the pulley, I employ a vertical rod 36, having a collar 37, to which the rod 5 is connected. The upper end of this rod 36 is adapted to fit in the groove 16 of the clutch, as shown in Fig. VIII, or to be moved down out of engagement with the groove, as shown in Fig. IX. When it is moved down, the spring 22 forces the clutch into engagement with the pulley 2, and when the rod 5 is released, the rod 36 is pulled up into the groove by means of a suitable spring, (not shown.) When the rod has entered the groove, a cam 38 in the groove of the clutch comes against the rod 36, and forces the clutch out of engagement with the pulley. In this form of the device, the brake shoe and lever are employed as in the other form; the shoe being moved by means of a bell-crank lever 39, pivoted to the frame at 50, one arm of which is connected to the lever of the brake by means of a link 51, while the other arm is connected to the rod 36 by means of a collar 52, (see Fig. VIII.)

The operation of my improved clutch in a lasting machine is fully explained in my pending application, filed June 27, 1893, Serial No. 478,991, but it is evident that it may be applied to other classes of machines.

I claim as my invention—

1. The combination of a pulley, a clutch adapted to engage the pulley, a shaft upon which the pulley and clutch are mounted, a spring for forcing the clutch into engagement with the pulley, means for disengaging the clutch from the pulley, and a cam turned by said shaft, and which is adapted to engage said means to force the clutch out of engagement with the pulley; substantially as set forth.

2. The combination of a pulley, a clutch adapted to engage the pulley, a shaft upon which the pulley and clutch are mounted, a spring for forcing the clutch into engagement with the pulley, a bell-crank lever engaging the clutch, a cam carried by said shaft, and which is adapted to engage one end of the bell-crank lever, to disengage the clutch, and means for moving the bell-crank out of the path of said cam; substantially as and for the purpose set forth.

3. The combination of a pulley, a clutch adapted to engage the pulley, a shaft upon which the pulley and clutch are mounted, a spring for forcing the clutch into engagement with the pulley, a bell-crank lever engaging the clutch, a pivoted link to which the bell-crank lever is secured, a cam carried by said shaft, and which is adapted to move said lever to disengage the clutch, and means for drawing said bell-crank lever and pivoted arm downwardly away from said cam; substantially as and for the purpose set forth.

4. The combination of a pulley, a clutch adapted to engage the pulley, a shaft upon which the pulley and clutch are mounted, a spring for forcing the clutch into engagement with the pulley, a bell-crank lever engaging said pulley, a cam adapted to engage one end of the bell crank lever, and means for supporting and moving said lever out of the path of said cam; said means consisting essentially of a pivoted link 12, links 9 and 11, a bell-crank lever 6, secured at one end to said link 9, and at the other end to a moving lever, and a spring 21; substantially as and for the purpose set forth.

5. The combination of a pulley, a clutch adapted to engage the pulley, and having a brake rib 30, a shaft upon which the pulley and clutch are mounted, a spring for forcing the clutch into engagement with the pulley, a bell crank lever engaging the clutch, a cam carried by the shaft, and which is adapted to engage said bell-crank lever, and means for moving said bell crank lever, and applying a brake; consisting essentially of links 9 and 11, a bell crank lever 6, a brake bar 31, and a lever 33; substantially as and for the purpose set forth.

CHARLES SINNING.

In presence of—
A. M. EBERSOLE,
C. G. EDWARDS.